US010090767B2

(12) United States Patent
Yamane

(10) Patent No.: US 10,090,767 B2
(45) Date of Patent: Oct. 2, 2018

(54) SWITCHING POWER SUPPLY DEVICE HAVING A PULSE WIDTH HOLDER

(71) Applicant: FUJI ELECTRIC CO., LTD., Kawasaki-shi, Kanagawa (JP)

(72) Inventor: Hiroki Yamane, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 15/218,629

(22) Filed: Jul. 25, 2016

(65) Prior Publication Data

US 2017/0077825 A1    Mar. 16, 2017

(30) Foreign Application Priority Data

Sep. 15, 2015   (JP) .................................. 2015-182292

(51) Int. Cl.
    *H02M 3/335*    (2006.01)
    *H02M 1/00*     (2006.01)

(52) U.S. Cl.
    CPC ................. *H02M 3/33507* (2013.01); *H02M 2001/0009* (2013.01); *H02M 2001/0032* (2013.01); *H02M 2001/0054* (2013.01); *Y02B 70/1491* (2013.01); *Y02B 70/16* (2013.01)

(58) Field of Classification Search
    None
    See application file for complete search history.

(56) References Cited

U.S. PATENT DOCUMENTS

| 2009/0237050 | A1  | 9/2009  | Yamada et al. |
| 2011/0285344 | A1* | 11/2011 | Lin ........................ H02J 7/0052 320/107 |
| 2012/0106208 | A1* | 5/2012  | Sugawara ......... H02M 3/33523 363/21.13 |

FOREIGN PATENT DOCUMENTS

| JP | 2009-225649 | 10/2009 |
| JP | 2012-100451 | 5/2012  |

* cited by examiner

*Primary Examiner* — Jeffrey Gblende

(57) ABSTRACT

A switching power supply device includes a switching element connected in series with a primary winding of a transformer, to which an input voltage is applied, a switching operation unit configured to obtain an output voltage from a secondary winding of the transformer, and a controller configured to control switching of the switching element. The controller includes an oscillator configured to output a switching control signal of controlling the switching element, a feedback voltage determination circuit, a drive circuit including a comparator and the like, and a pulse width holder configured to hold a pulse width of the switching control signal, when the load is light, at least at a minimum pulse width capable of contributing to supplying the power to a load.

3 Claims, 7 Drawing Sheets

SWITCHING POWER SUPPLY DEVICE HAVING A PULSE WIDTH HOLDER

CROSS REFERENCE TO RELATED APPLICATIONS AND INCORPORATION BY REFERENCE

This application claims benefit of priority under 35 USC 119 based on Japanese Patent Application No. 2015-182292 filed on Sep. 15, 2015, the entire contents of which are incorporated by reference herein.

BACKGROUND OF THE INVENTION

Field of the Invention

The present invention relates to a switching power supply device configured to control an output voltage with a feedback signal and the like.

The switching power supply device is configured to convert a commercially available alternating current (AC) voltage into an arbitrary direct current voltage, and to output the converted voltage. As an example of the switching power supply device, a flyback type of switching power supply device is known (for example, see JP 2012-100451 A).

In such a flyback type of switching power supply device, as illustrated in FIG. 7, a diode bridge 101 rectifies full waves from a commercially-available alternating current power supply 100, and the power is supplied to one end of a primary winding L1 of a flyback transformer 102. A series circuit made up of a switching element 103 and a current detection resistor 104 is connected between the other end of the primary winding L1 and the ground, and a semiconductor controller 110 controls switching of the switching element 103, so that a predetermined direct current (DC) voltage, which is an output from a secondary winding L2 of the flyback transformer 102 that has been rectified, is supplied to a load 105. The direct current voltage to be supplied to the load 105 is detected by a shunt regulator circuit 106, and is then supplied as a feedback voltage to the semiconductor controller 110 through a photocoupler 107.

In the above-described semiconductor controller 110, as illustrated in FIG. 8, a feedback voltage of the voltage to be supplied to the load is input into an FB terminal, and in addition, a current detection signal generated by the current detection resistor 104 that detects the current flowing across the switching element 103 is input into a CS terminal. A comparator 115 compares the current detection signal with a level-shifted voltage that has been level shifted by a level shift circuit 114 (to be specific, the voltage obtained by level shifting, by the level shift circuit 114, the slope-compensated feedback voltage obtained by reducing the signal output from a slope compensation circuit). When the current detection signal reaches the level-shifted voltage, a comparison signal of high level is output from the comparator 115. In the semiconductor controller 110, an oscillation output from an oscillator 111, which oscillates a pulse signal having the frequency depending on the feedback voltage, is supplied to a one-shot circuit 112. A one-shot signal from the one-shot circuit 112 is supplied to a set terminal of an RS flip flop 113. The above-described output signal from the comparator 115 is input into a reset terminal of the RS flip flop 113. The output from the RS flip flop 113 and the output from the one-shot circuit 112 are supplied to an OR gate 117. An output signal from the OR gate 117 is supplied to an AND gate 118, to one of input sides of which the output from the oscillator 111 has been supplied. Then, an output from the AND gate 118 is supplied to a gate driver 116. Then, from the gate driver 116, a switching control signal for controlling the switching element is output.

An operation of the above-described example when the load is light will be described below. When the load is light, the feedback voltage Vfb to be input into the FB terminal of the semiconductor controller 110 increases relatively moderately, as illustrated in FIG. 10A. At a time point t1, after exceeding a preset threshold voltage Vfbt, the feedback voltage Vfb reaches an upper peak value. Then, the feedback voltage Vfb decreases relatively steeply. At a time point t2, the feedback voltage Vfb decreases to be lower than the preset threshold voltage Vfbt, and reaches a lower peak value, not illustrated. Then, the feedback voltage Vfb increases moderately again. The above operation is repeated.

The feedback voltage Vfb that has been input into the FB terminal is level shifted by the level shift circuit 114. In the level shift circuit 114, a relationship between the feedback voltage Vfb and an output voltage Vfb_in is set by a characteristic line Lls, as illustrated in FIG. 9. In this example, a change rate of the output voltage Vfb_in is set to be smaller than a change rate of the feedback voltage Vfb.

For this reason, as illustrated in FIG. 10A, when the feedback voltage Vfb increases and decreases repeatedly, the output voltage Vfb_in of the level shift circuit 114 increases and decreases repeatedly in a state where an increasing rate and a decreasing rate of the feedback signal fb are suppressed, that is the inclination is suppressed, as illustrated in FIG. 10B.

In this situation, when the feedback voltage Vfb is equal to or smaller than the preset threshold voltage Vfbt, a comparator 119 outputs a comparison signal of low level to the one-shot circuit 112 and then stops an output of a one-shot signal from the one-shot circuit 112. On the other hand, when a current detection signal Vi reaches the output voltage Vfb_in, in which the feedback voltage has been level shifted, a comparison signal output from the comparator 115, and the comparison signal is input into the reset terminal of the RS flip flop 113. Hence, the RS flip flop 113 keeps a reset state, and its output signal keeps low level.

Hence, the output from the AND gate 118 keeps low level, a gate driver 116 stops an output of the switching control signal, and the switching element 103 is in off state.

In this situation, on the secondary winding L2 side of the flyback transformer 102, a current is being supplied to a load from an output capacitor connected with the secondary winding L2, but no energy is supplied to the output capacitor from the primary side, and an output voltage gradually decreases. Such a decrease in output voltage is detected by the shunt regulator circuit 106, and the feedback voltage Vfb, which is output from a photocoupler 107, increases, as illustrated in FIG. 10A.

Then, when the feedback voltage Vfb is equal to or higher than the preset threshold voltage Vfbt, an output from the comparator 119 is inverted to high level, an output of the one-shot signal from the one-shot circuit 112 is restarted, and the RS flip flop 113 is set accordingly. The output signal from the RS flip flop 113 is supplied to the gate driver 116 through the OR gate 117 and the AND gate 118. The switching control signal for turning on the switching element 103 is output from the gate driver 116.

When the switching element 103 becomes on state, the DC from the diode bridge 101 flows across the primary winding L1, the switching element 103, and the current detection resistor 104 of the flyback transformer 102.

Hereby, as illustrated in FIG. 10B, a current detection signal Vi (i.e., the voltage of the CS terminal), which is detected by the current detection resistor 104, starts increasing. After the current detection signal Vi slope-compensates the feedback voltage Vfb, when the feedback voltage Vfb reaches the level-shifted voltage Vfb_in, a comparison signal of high level is output from the comparator 115, and the RS flip flop 113 is reset. The switching control signal output from the gate driver 116 becomes off state, accordingly, as illustrated in FIG. 10C.

Afterward, whenever the one-shot signal is generated from the one-shot circuit 112, the switching control signal output from the gate driver 116 becomes ON state. When the current detection signal Vi reaches the voltage Vfb_in that is obtained by level shifting the feedback signal, the switching control signal is controlled to be in off state. This operation is repeated. Then, when the energy is sufficiently supplied to the secondary side from the primary side, the output voltage increases, and the feedback voltage Vfb decreases. When the feedback voltage Vfb is smaller than the preset threshold voltage Vfbt at the time point t2, the output of the switching control signal is stopped until the feedback voltage Vfb recovers to be equal to or higher than the preset threshold voltage Vfbt.

SUMMARY OF THE INVENTION

In the above-described conventional example, however, in the conversion characteristics of the level shift circuit 114, as illustrated in FIG. 9, when the feedback voltage Vfb increases from zero, the output voltage Vfb_in from the level shift circuit 114 is set to increase from zero. Therefore, as illustrated in FIG. 10A, in the light load state, when the feedback voltage Vfb decreases steeply, the output voltage Vfb_in, in which the feedback voltage Vfb has been level shifted, also decreases steeply as illustrated in FIG. 10B.

For this reason, when the one-shot signal is output from the one-shot circuit 112, immediately before the time point t2, when the feedback voltage Vfb decreases to be smaller than the preset threshold voltage Vfbt, and when the switching control signal output from the gate driver 116 becomes on state, as illustrated in FIG. 10C, there is a case where the current detection signal Vi starts increasing and immediately reaches the output voltage Vfb_in. In such a case, the pulse width of on state of the switching control signal output from the gate driver 116 is too short, and the energy accumulated in the primary winding L1 of the flyback transformer 102 reduces. This situation causes a drawback that there is no contribution to supplying the power to the load 105, leads to a switching loss state where the switching element 103 is merely switched on, and the switching loss deteriorates the efficiency.

Therefore, the present invention has been made in view of the above-circumstances, and has an object to provide a switching power supply device configured to limit the pulse width of the switching control signal not to be too short, so that the power supply efficiency to a load can be improved by the switching operation of the switching element.

According to one aspect of the present invention, there is provided a switching power supply device, including: a switching power supply operation unit configured to control switching of a switching element connected in series with a primary main winding of a transformer to which an input voltage is applied, and to rectify a voltage generated at a secondary main winding of the transformer to obtain an output voltage to be output to a load; and a controller configured to control the switching of the switching element. The controller includes: a feedback voltage determination circuit configured to determine whether a feedback voltage indicating a difference between a predetermined output voltage and the output voltage is lower than a preset threshold; a comparator circuit configured to compare a signal based on the feedback voltage with a current detection signal obtained by detecting a current of the switching element, as a voltage; an oscillation circuit configured to oscillate at a frequency based on the feedback voltage; a drive circuit configured to output a switching control signal of controlling the switching element based on a determination result of the feedback voltage determination circuit, a comparison signal of the comparator circuit, and an oscillation signal of the oscillation circuit; and a pulse width holder configured to hold a pulse width of the switching control signal at least at a minimum pulse width capable of contributing to supplying power to a load, when the load is light.

DETAILED DESCRIPTION

Figure 1:
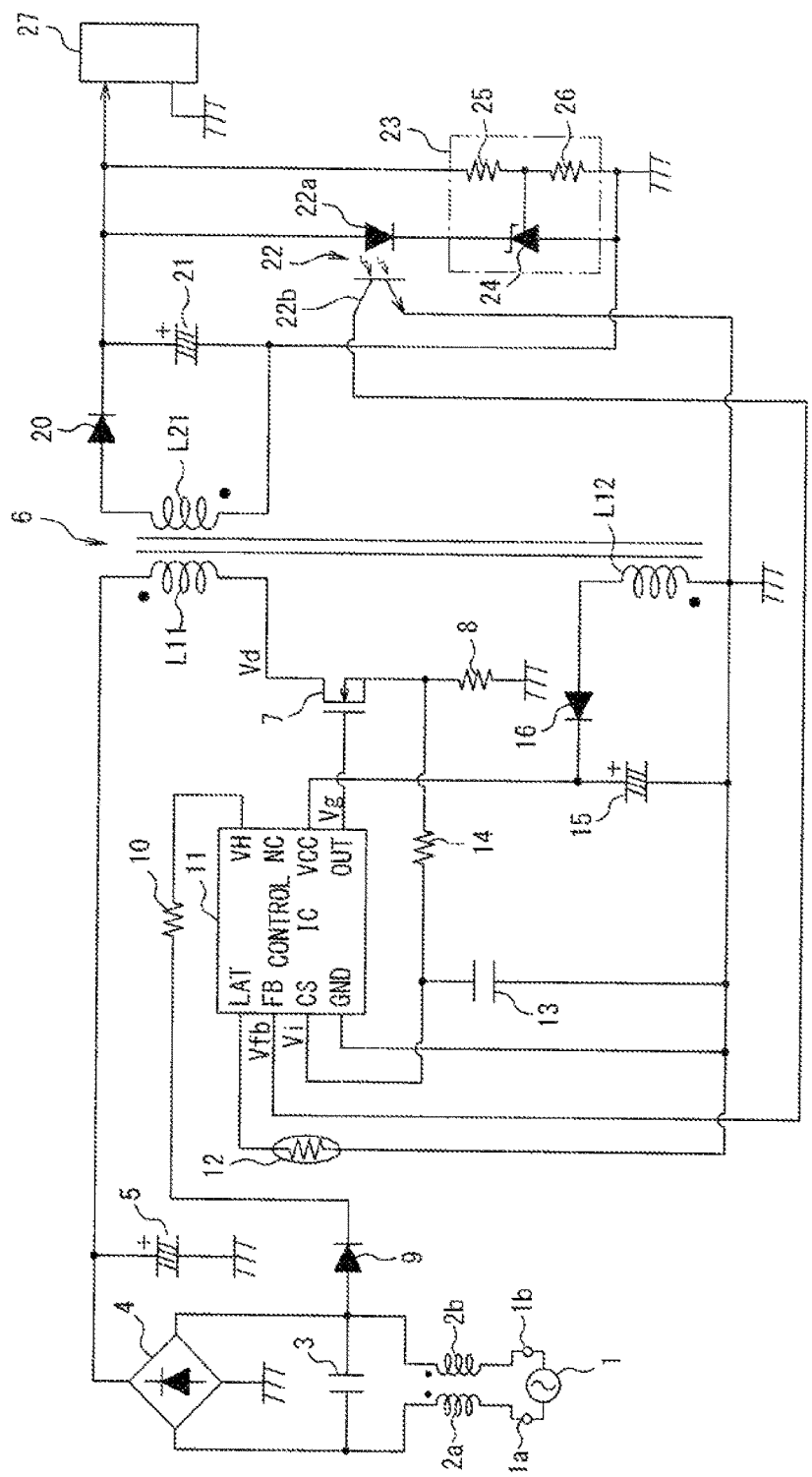
FIG. 1 is a circuit diagram of a whole configuration of a switching power supply device in one embodiment of the present invention.

Embodiments of the present invention will be described with reference to the drawings. In the drawings to be referred to, identical or similar parts are applied with identical or similar reference numerals.

Also, embodiments to be illustrated in the following description illustrate devices and methods to embody the technical idea of the present invention. The technical idea of the present invention does not especially limit the materials, shapes, structures, or arrangements of the component parts to the following ones. In the technical scope recited in claims, various changes or modifications can be added to the technical idea of the present invention.

Hereinafter, a switching power supply device in one embodiment of the present invention will be described with reference to the drawings.

As illustrated in FIG. 1, in the whole configuration of the switching power supply device, alternating current (AC) input terminals 1a and 1b are connected with an AC power supply. The AC input terminals 1a and 1b are connected with first ends of windings 2a and 2b form a transformer, and second ends of the windings 2a and 2b are connected with both terminals of a capacitor 3. The windings 2a and 2b and the capacitor 3 are included in an input filter.

Both terminals of the capacitor 3 are respectively connected with AC input terminals of a diode bridge 4, the positive terminal on the output side of the diode bridge 4 is connected with the positive terminal of a smoothing capacitor 5, and is also connected with a first end of a primary winding L11 of a flyback transformer 6. A second end of the primary winding L11 is connected with the drain of an N-channel Metal-Oxide-Semiconductor Field-Effect Transistor (MOSFET) 7, which operates as a switching element. The source of the MOSFET 7 is grounded through a current detection resistor 8.

The gate of the MOSFET 7 is connected with an OUT terminal of a control circuit 11, which operates as a controller, and performs a switching operation in accordance with a switching control signal output from the OUT terminal.

The control circuit 11 is made up of an integrated circuit including not only the OUT terminal but also a VH terminal, a LAT terminal for overheat latch protection, an FB terminal for feedback control, a CS terminal for current detection, a GND terminal, and a VCC terminal for internal power supply generation.

The VH terminal of the control circuit 11 is connected with a first end of the capacitor 3 through a diode 9 and a current limiting resistor 10. The LAT terminal of the control circuit 11 is connected with one end of a thermistor 12, and the other end of the thermistor 12 is grounded. The FB terminal of the control circuit 11 is connected to receive a signal corresponding to an output voltage. The CS terminal of the control circuit 11 is connected with a common connection point of a capacitor 13 and a resistor 14, the other end of the capacitor 13 is grounded, and the other end of the resistor 14 is connected with the current detection resistor 8. The capacitor 13 and the resistor 14 are included in a noise filter of filtering a signal detected by the current detection resistor 8.

The VCC terminal of the control circuit 11 is connected with the positive terminal of the capacitor 15 and the cathode terminal of the diode 16, and the negative terminal of the capacitor 15 is grounded. The anode terminal of the diode 16 is connected with one end of a primary-side auxiliary winding L12 of the transformer 6, and the other end of the primary-side auxiliary winding L12 is grounded. The capacitor 15, the diode 16, and the primary auxiliary winding L12 are included in a circuit configured to convert an AC voltage generated by the primary-side auxiliary winding L12 into a direct current (DC) power supply voltage, and configure a power supply circuit of the control circuit 11.

The transformer 6 includes a secondary winding L21, and one end of the secondary winding L21 is connected with the anode terminal of the diode 20. The cathode terminal of the diode 20 is connected with the positive terminal of a capacitor 21, and the negative terminal of the capacitor 21 is connected with the other end of the secondary winding L21 and is also grounded. The secondary winding L21, the diode 20, and the capacitor 21 are included in a circuit configured to convert the AC voltage generated by the secondary winding L21 into a DC voltage, and configure an output circuit of the switching power supply device. The positive terminal of the capacitor 21 is connected with a load 27.

The positive terminal of the capacitor 21 is connected with the anode terminal of a light emitting diode 22a of a photocoupler 22, and the cathode terminal of the light emitting diode 22a is connected with the cathode terminal of a shunt regulator 24 included in a shunt regulator circuit 23, and the anode terminal of the shunt regulator 24 is grounded.

The shunt regulator 24 is connected with a connection point of partial pressure resistors 25 and 26, which are included in the shunt regulator circuit 23, and which are connected in series between the positive terminal and the negative terminal of the capacitor 21. The shunt regulator circuit 23 is configured to detect the voltage supplied to the load 27, and the detection result, which is the feedback voltage Vfb, is supplied to the control circuit 11 through the photocoupler 22. The feedback voltage Vfb also serves as a signal indicating the magnitude of the load. As the load is heavier (i.e., as the current flowing across the load 27 increases), the value of the feedback voltage Vfb is larger, whereas as the load is lighter (i.e., the current flowing across the load 27 decreases), the value of the feedback voltage Vfb is smaller.

Herein, the AC power supply 1, the diode bridge 4, the smoothing capacitor 5, the flyback transformer 6, the MOSFET 7, the diode 20, and the capacitor 21 are included in a switching power supply operation unit.

Figure 2:
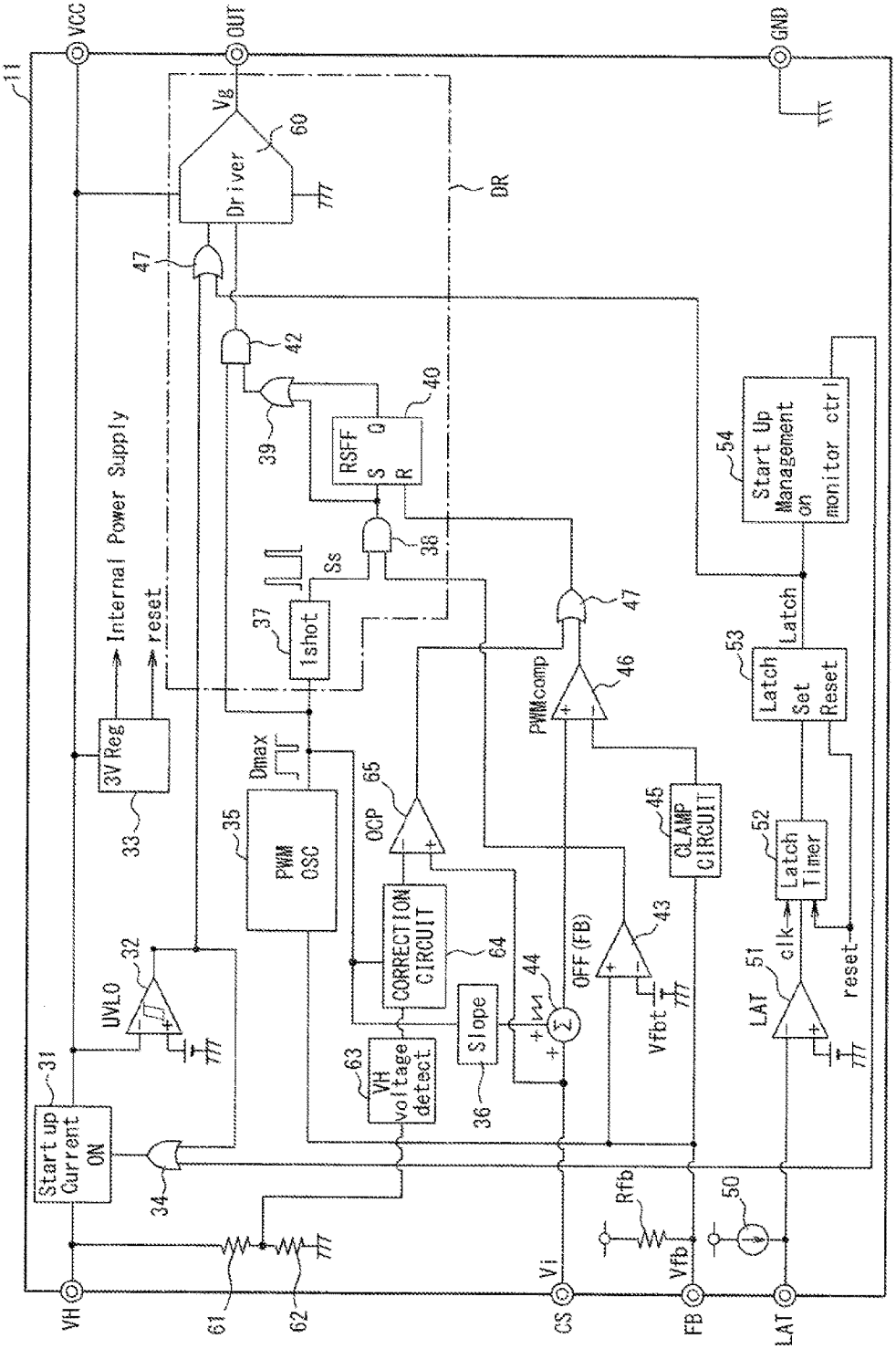
FIG. 2 is a block diagram of a specific configuration of a control circuit in FIG. 1.

Next, a specific configuration of the control circuit 11 will be described with reference to FIG. 2. The control circuit 11 includes a start up circuit 31, which is connected between the VH terminal and the VCC terminal, and which is configured to supply the current from the VH terminal to the VCC terminal at the time of starting up, under voltage lock out (UVLO) circuit 32, which is connected between the start up circuit 31 and the VCC terminal, and which is configured to stop the control circuit 11, when the voltage of the VCC terminal is low, and an internal power supply circuit 33, which is connected with the VCC terminal, and which is configured to serve as an internal power supply of, for example, three volts. The VH terminal is configured to supply the current to the power supply terminal VCC at the time of starting up, and the VCC terminal is the main power supply terminal of the control circuit 11.

The output voltage from the under voltage lockout (UVLO) circuit 32 is supplied as a start up signal to the start up circuit 31 through an OR gate 34, and is also supplied as an operation stop signal through an OR gate 49, as will be described below, to a gate driver 60.

The internal power supply circuit 33 is configured to supply the internal power supply voltage of three volts as an operation power supply to each of the circuits in the control circuit 11, when the power supply voltage of the VCC terminal falls within a normal range. The internal power supply circuit 33 is also configured to output a reset signal of resetting each of the circuits in the control circuit 11, when the power supply voltage of the VCC terminal is lower than a preset voltage.

Figure 3:
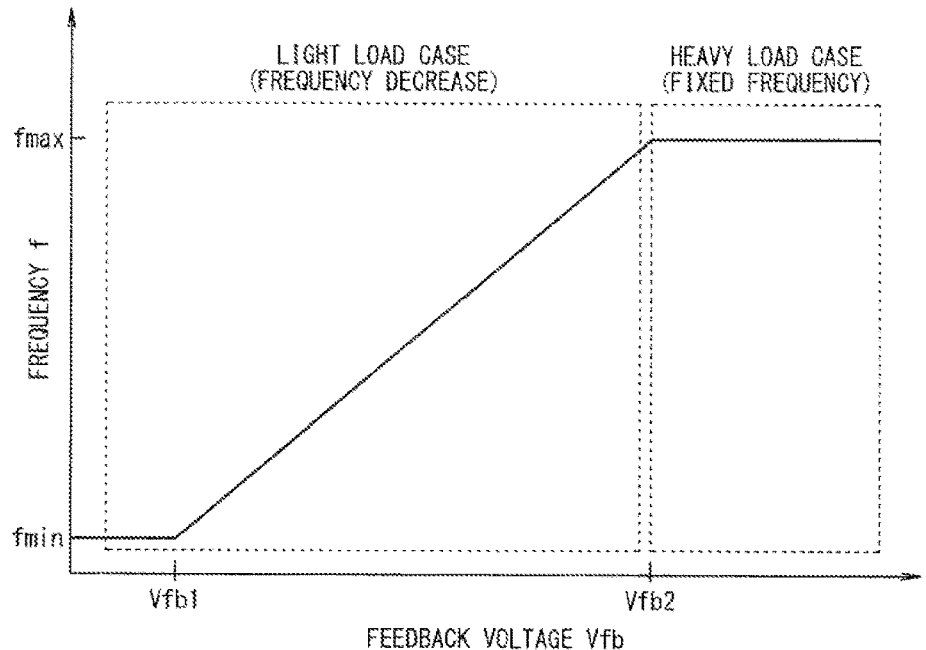
FIG. 3 is a characteristic diagram indicating frequency characteristics of a pulse width modulation oscillator.

The control circuit 11 includes a pulse width modulation (PWM) oscillator 35 connected with the FB terminal. The PWM oscillator 35 has frequency characteristics with respect to the feedback voltage Vfb, as illustrated in FIG. 3. In other words, in a heavy load case where the feedback voltage Vfb is equal to or larger than a predetermined voltage Vfb2, which is relatively large, the frequency f is constant at the maximum frequency fmax, whereas in a light load case where the feedback voltage Vfb is smaller than the predetermined voltage Vfb2, the frequency f decreases as the feedback voltage Vfb decreases from predetermined voltage Vfb2. When the frequency f is equal to or smaller than a predetermined voltage Vfb1, which is considerably smaller than the predetermined voltage Vfb2, the frequency f is set to be fixed at the minimum frequency fmin. The signal Dmax, which is output from an output side of the PWM oscillator 35, is a signal defining the highest duty ratio (on-time ratio) in a switching cycle.

The output side of the PWM oscillator 35 is connected with a slope compensation circuit 36 configured to prevent a subharmonic oscillation, and is connected with a one-shot circuit 37 configured to output a one-shot signal Ss having a predetermined width that is relatively short. The output side of the one-shot circuit 37 is connected with one of the terminals of the input terminals of an AND gate 38. The output side of the AND gate 38 is connected with one of the input terminals of an OR gate 39.

The output side of the AND gate 38 is connected with a set terminal S of an RS flip flop 40, and an output terminal Q of the RS flip flop 40 is connected with the other one of the input terminals of the OR gate 39.

The output side of the OR gate 39 and the output side of the PWM oscillator 35 are individually connected with two input terminals of an AND gate 42, and the output side of the AND gate 42 is connected with the gate driver 60.

In the control circuit 11, the FB terminal is connected through a resistor Rfb with the internal power supply circuit 33, so as to supply the current to a phototransistor 22b configured to output the feedback voltage Vfb. The FB terminal is connected with a feedback voltage determination circuit 43, which is configured to determine whether the feedback voltage Vfb is smaller than the preset threshold voltage Vfbt, which has a relatively small value. The feedback voltage determination circuit 43 includes a comparator. The preset threshold voltage Vfbt is input into a non-inverting input terminal of the comparator, and the feedback voltage is input into an inverting input terminal thereof. In the feedback voltage determination circuit 43, a determination signal is output to the other one of the input terminals of the AND gate 38. The determination signal is high level when the feedback voltage Vfb is higher than the preset threshold voltage Vfbt, whereas the determination signal is low level when the feedback voltage Vfb is lower than the preset threshold voltage Vfbt.

Figure 4:
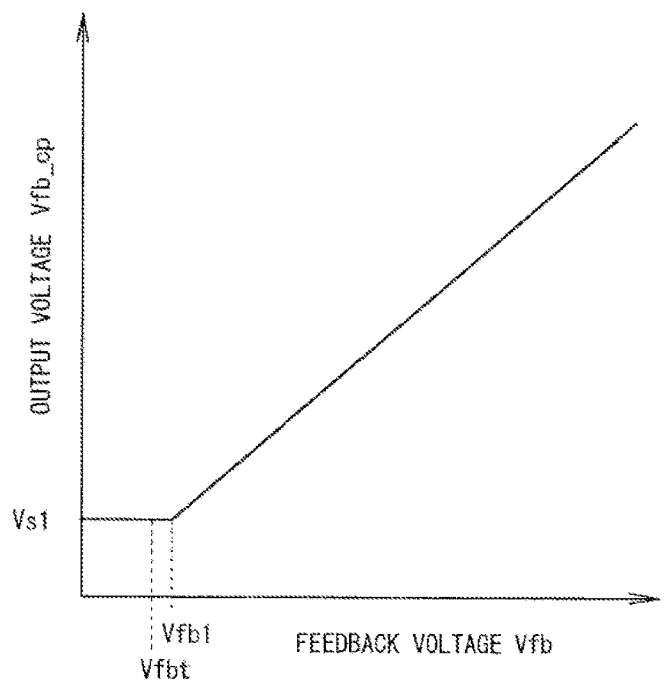
FIG. 4 is a characteristic diagram indicating cramp characteristics of a feedback voltage clamp circuit.
Figure 7:
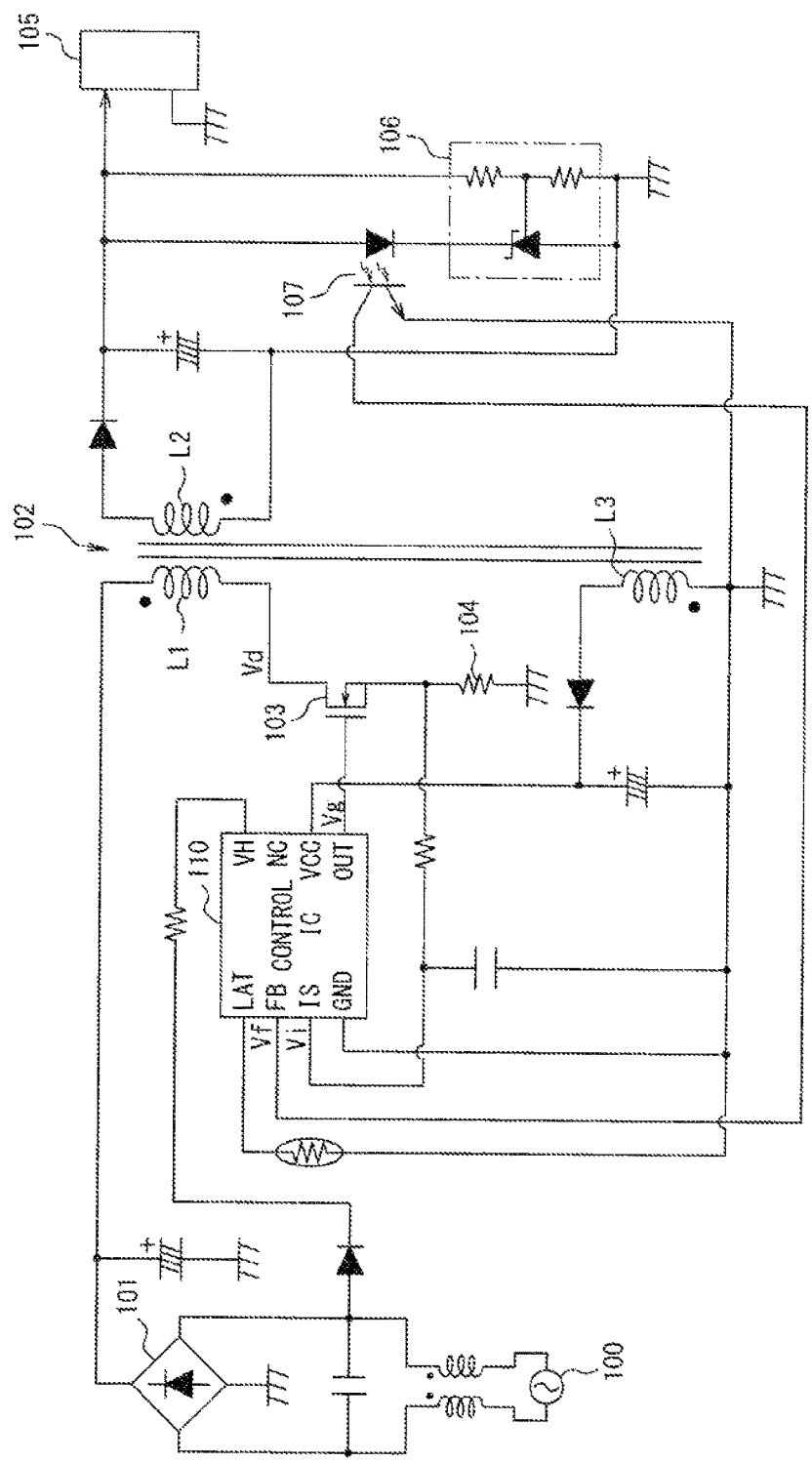
FIG. 7 is a circuit diagram of the whole configuration of the switching power supply device in a conventional example.
Figure 8:
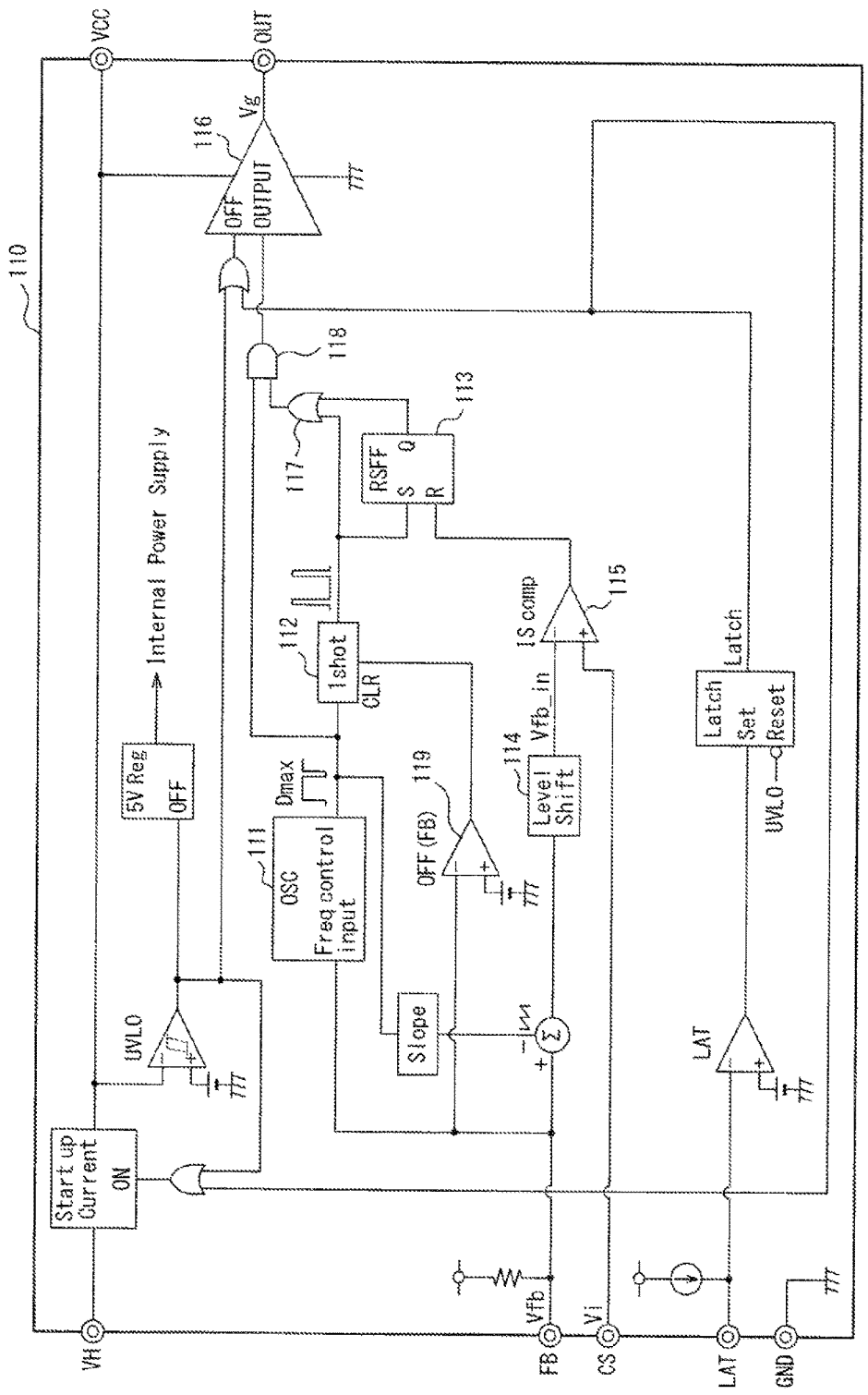
FIG. 8 is a block diagram of a specific configuration of a semiconductor controller in FIG. 7.
Figure 9:
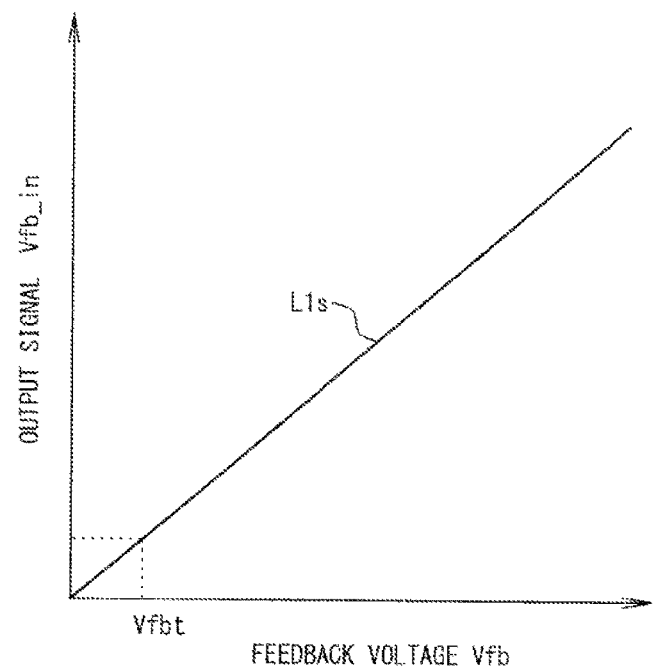
FIG. 9 is a characteristic diagram indicating level shift characteristics of a level shift circuit.
Figure 10:
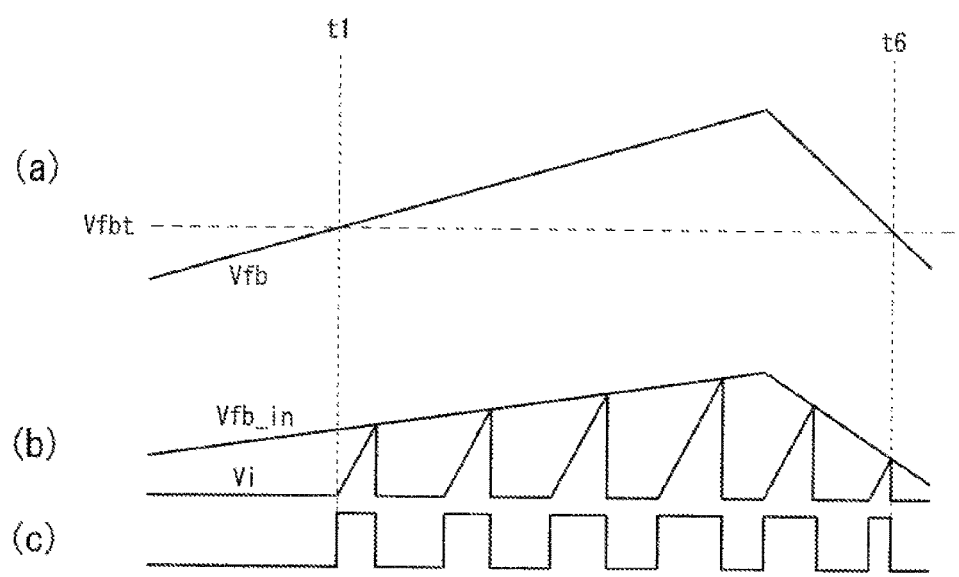
FIG. 10 is a signal wave diagram used for description of an operation when the load is light in a conventional example.

Further, when a comparator 46 compares the voltage at the FB terminal with the voltage at the CS terminal, the signal output from the slope compensation circuit is subtracted from the voltage at the FB terminal in the conventional semiconductor controller illustrated in FIG. 7. However, in one embodiment of the present invention, an adder 44 is connected with the CS terminal so as to add a compensation signal output from the slope compensation circuit 36 to the voltage at the CS terminal. The FB terminal is connected with a feedback voltage clamp circuit 45, which operates as a pulse width holder. The feedback voltage clamp circuit 45 is configured such that a relationship between the feedback voltage Vfb and the output voltage Vfb_cp is set as illustrated in FIG. 4. When the feedback voltage Vfb is equal to or higher than a present voltage Vfb1, which is higher than the preset threshold voltage Vfbt of the feedback voltage determination circuit 43, as the feedback voltage Vfb increases, the output voltage Vfb_cp increases, whereas when the feedback voltage Vfb is smaller than the preset voltage Vfb1, the output signal Vfb_cp is clamped at a constant voltage Vs1.

Figure 5:
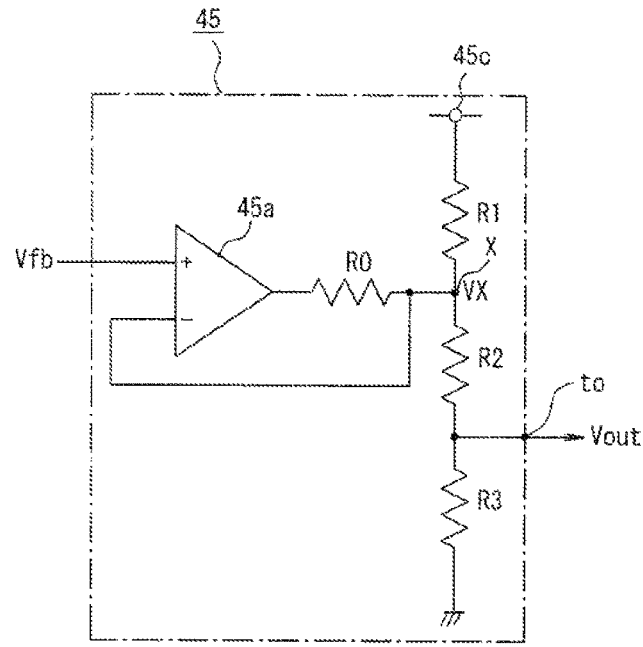
FIG. 5 is a circuit diagram of a specific configuration of the feedback voltage clamp circuit.

Herein, a specific configuration of the feedback voltage clamp circuit 45 is illustrated in FIG. 5. In other words, the feedback voltage clamp circuit 45 includes an operational amplifier 45a, a series circuit, a fourth resistor R0, and an output terminal "to". The operational amplifier 45a has a non-inverting input terminal, into which the feedback voltage Vfb is input. The series circuit is arranged between a power supply terminal 45c, to which the internal power supply voltage is supplied from the internal power supply circuit 33, and the ground, and includes a first resistor R1 connected in series with a voltage dividing circuit including a second resistor R2 and a third resistor R3. The fourth resistor R0 is connected between an output terminal of the operational amplifier 45a and a connection point X of the first resistor R1 and the second resistor R2. The output terminal "to" is connected with a connection point of the second resistor R2 and the third resistor R3.

A connection point of the fourth resistor R0 and the connection point X is connected with the inverting input terminal of the operational amplifier 45a.

Here, when it is supposed that the power supply voltage of the operational amplifier 45a is also supplied with the internal power supply voltage from the internal power supply circuit 33 and the grand potential, the voltage that can be output from the operational amplifier 45a falls within a voltage range between an upper limit voltage that is the internal power supply voltage and a lower limit voltage of 0 volts that is the ground (GND) potential.

When it is supposed as described above, and in addition, the internal power supply voltage is set to three volts, a voltage VX at the connection point X of the first resistor R1 and the second resistor R2 can be calculated as follows.

Firstly, when an output from the operational amplifier 45a reaches the internal power supply voltage of three volts, the first resistor R1 and the fourth resistor R0 can be considered to be connected in parallel with each other. In this case, the maximum output voltage Vomax of the output voltage Vout from the feedback voltage clamp circuit 45 can be represented as follows with R0 to R3 being resistance values of the resistors R0 to R3.

Expression 1

$$Vomax = \frac{R3}{R0 // R1 + R2 + R3} \cdot 3 \qquad (1)$$
$$= \frac{(R0 + R1)R3}{R0(R1 + R2 + R3) + R1(R2 + R3)} \cdot 3$$

Thus, the maximum value VXmax of the voltage V can be represented as follows.

Expression 2

$$VXmax = Vomax \cdot \frac{R2 + R3}{R3} \qquad (2)$$
$$= \frac{(R0 + R1)(R2 + R3)}{R0(R1 + R2 + R3) + R1(R2 + R3)} \cdot 3$$

On the other hand, when the output from the operational amplifier 45a reaches the minimum voltage of 0 volts, the output voltage Vout is the minimum, and the minimum output voltage Vomin can be represented as follows.

Expression 3

$$Vomin = \frac{R0 // (R2 + R3)}{R0 // (R2 + R3) + R1} \cdot \frac{R3}{R2 + R3} \cdot 3 \qquad (3)$$
$$= \frac{R0 \cdot R3}{R0(R1 + R2 + R3) + R1(R2 + R3)} \cdot 3$$

Thus, VXmax can be represented as follows.

Expression 4

$$VXmin = Vomin \cdot \frac{R2 + R3}{R3} \qquad (4)$$
$$= \frac{R0(R2 + R3)}{R0(R1 + R2 + R3) + R1(R2 + R3)} \cdot 3$$

Therefore, when all of the resistance values of the first to fourth resistors R1 to R4 are 1 ohm, the maximum voltage VXmax at the point X, VXmax=(4/5)×3 volts, the minimum voltage VXmin at the point X, VXmin=(2/5)×3 volts, the maximum output voltage Vomax=(2/5)×3 volts, and the minimum output voltage Vomin=(1/5)×3 volts. The voltage is clamped at a constant voltage on the upper and lower sides of the feedback voltage Vfb.

The clamped voltages of the maximum output voltage Vomax and the minimum output voltage Vomin can be set arbitrarily by selecting the resistance values of the first resistor R1 to the fourth resistor R0. When the output from the operational amplifier 45a is lower than the internal power supply voltage of three volts and higher than the minimum voltage of 0 volts, virtual short-circuiting of the operational amplifier 45a makes the voltage VX equal to the feedback voltage Vfb, and the output voltage Vout has a value obtained by dividing the feedback voltage Vfb with the resistors R1 and R2.

The output side of the feedback voltage clamp circuit 45 is connected with the inverting input terminal of the comparator 46 included in a comparator circuit, and the non-inverting input terminal of the comparator 46 is connected with the output side of the adder 44. Thus, the comparator 46 is configured to output a comparison signal that is low level, when a clamp output signal Vfb_cp is larger than the output from the adder 44, and to output a comparison signal that is high level, when the clamp output signal Vfb_cp is smaller than the output from the adder 44. The output side of the comparator 46 is connected with the reset terminal R of the RS flip flop 40 through an OR gate 47.

The control circuit 11 includes: a constant current source 50 configured to supply a current to the LAT terminal; a comparator 51 configured to detect a voltage drop at the LAT terminal, and to output a comparison signal of high level; a latch timer circuit 52 configured to receive the comparison signal from the comparator 51, and to output a timer signal of high level, when the high level of the comparison signal continues for a predetermined period; and a latch circuit 53, which includes a set terminal SET to which the timer signal of high level is input from the latch timer circuit 52. While protecting the heat from the latch circuit 53, a latch signal of high level is input through the OR gate 47 into an OFF terminal of the gate driver 60, and is also input into an ON terminal of a start up management circuit 54. The start up management circuit 54 is configured to monitor the power supply voltage of the VCC terminal, and to output a start up signal through the OR gate 34 to the start up circuit 31, when the power supply voltage drops.

Herein, a drive circuit DR includes the one-shot circuit 37, the AND gate 38, the RS flip flop 40, the OR gate 39, the AND gate 42, the OR gate 47, and the gate driver 60.

The control circuit 11 includes resistors 61 and 62, which are arranged between the VH terminal and the ground, and which are configured to divide the voltage Vh. A connection point of the resistors 61 and 62 is connected with a VH voltage detection circuit 63. The voltage Vh detected by the VH voltage detection circuit 63 is corrected by a correction circuit 64. The control circuit 11 further includes an over-current comparator 65 configured to receive the corrected voltage and a current detection signal Vi, which is supplied to the CS terminal.

An operation in the light load case in one embodiment of the present invention will be described with reference to FIG. 6.

Figure 6:
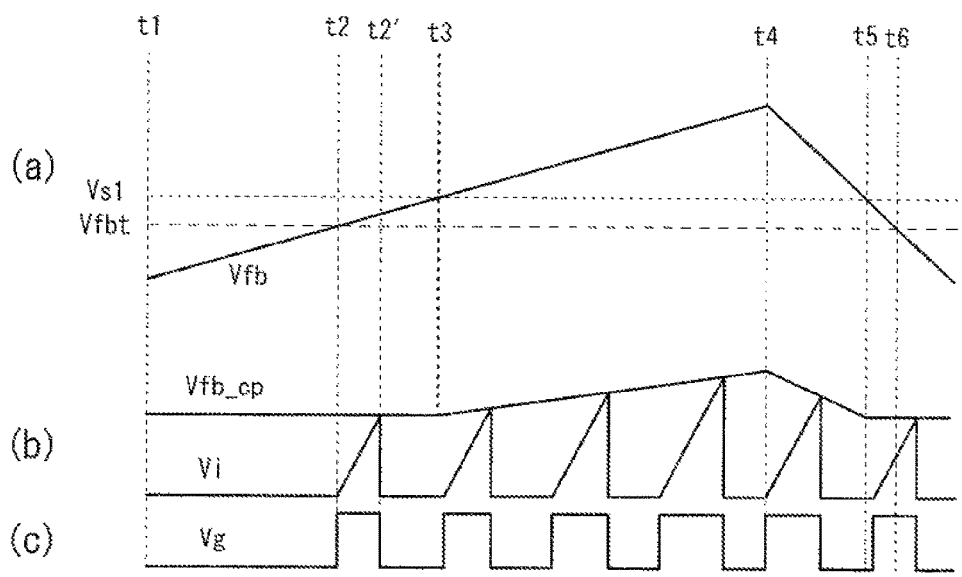
FIG. 6 is a signal wave diagram used for describing an operation when a load is light.

In the light load case, as illustrated in (a) of FIG. 6, the feedback voltage Vfb, which is input into the FB terminal of the control circuit 11, increases from the time point t1 relatively moderately, exceeds the preset threshold voltage Vfbt at the time point t2, reaches the upper peak at the time point t4, then decreases relatively steeply, and further decreases to be lower than the present threshold voltage Vfbt at the time point t6. Although not illustrated, after having reached the lower peak value, the feedback voltage Vfb increases moderately again, and such an operation is repeated.

Herein, the reason why the feedback voltage Vfb decreases steeply, after passing the time point t4 is that when a burst operation starts, the load is light. By switching the MOSFET 7, the output voltage increases rapidly and the feedback voltage Vfb decreases rapidly. In other words, since there is little power supplied to the load, most of the energy to be supplied to the secondary side from the primary side is accumulated in the capacitor 21 directly. Hence, a small amount of the switching operation of the MOSFET 7 increases the voltage of the capacitor 21, in other words, the output voltage on the secondary side increases immediately. When the output voltage on the secondary side increases, the amount of the current flowing across the shunt regulator 24, which is a photodiode 21a, increases. Then, since the on-resistance of the phototransistor 22b decreases, the feedback voltage Vfb, which is an output voltage of the photo-coupler 22, decreases rapidly.

The feedback voltage Vfb, which has been input into the FB terminal of the control circuit 11, is clamped by the feedback voltage clamp circuit 45 at the constant voltage Vs1 at least in a lower region than the predetermined voltage Vfb1, which is higher than the preset threshold voltage Vfbt of the feedback voltage determination circuit 43, as illustrated in FIG. 4. The feedback voltage clamp circuit 45 also has a level shift function (the voltage is divided by the resistors R2 and R3), as described above. Hence, an increase rate of the output signal Vfb_cp is set to be lower than an increase rate of the feedback voltage Vfb.

Thus, as illustrated in (b) of FIG. 6, the output signal Vfb_cp, which is output from the feedback voltage clamp circuit 45, keeps the above-described voltage Vomin in a segment of the time point t1 to the time point t3, while the feedback signal Vfb is lower than the constant voltage Vs1 (which is VXmin described above). After the time point t3, the output signal Vfb_cp increases at an increase rate smaller than an increase rate of the feedback voltage Vfb. After having reached the upper peak at the time point t4, the output signal Vfb_cp decreases at a decrease rate smaller than a decrease rate of the feedback voltage Vfb. At the time point t5, the feedback voltage Vfb reaches the constant voltage Vs1. Afterward, the output signal Vfb_cp keeps the constant voltage Vomin regardless of a decrease in the feedback voltage Vfb.

On the other hand, in the light load case, the PWM oscillator 35 outputs a signal Dmax defining the maximum duty ratio of the frequency f in proportion to the feedback voltage Vfb, as illustrated in FIG. 3. By supplying the signal Dmax to the one-shot circuit 37, a relatively short shot pulse is output at the rising of the signal Dmax, and such a shot pulse is supplied to the AND gate 38.

In this situation, the feedback voltage determination circuit 43 outputs the comparison signal of low level to the AND gate 38 from the time point t1 to the time point t2, while the feedback voltage Vfb is lower than the preset threshold voltage Vfbt. For this reason, the shot pulse is not output from the AND gate 38, and the RS flip flop 40 keeps a reset state.

In this state, the signal Dmax, which is output from the PWM oscillator 35, is supplied to the AND gate 42, and the one-shot pulse output from one-shot circuit 37 is also supplied to the AND gate 42 through the AND gate 38 and the OR gate 39. Therefore, the one-shot pulse is output from the AND gate 42 to the gate driver 60. The one-shot pulse controls on and off of the MOSFET 7, accordingly. Herein, the reason why the one-shot pulse is input into the OR gate 39 through the AND gate 38 is to prevent the switching element from turning off immediately in accordance with the noise generated when the switching element 7 (MOSFET 7) turns on. When the overcurrent comparator 65 detects the overcurrent, the pulse width of the one-shot pulse turns on the switching element. Such a pulse width is the minimum one of preventing the switching noise. This pulse width is so short period of time that the energy transfer is substantially impossible from the primary side to the secondary side.

Then, as illustrated in (a) of FIG. 6, when the feedback voltage Vfb exceeds the preset threshold voltage Vfbt at the time point t2, the determination signal of the feedback voltage determination circuit 43 is inverted to high level. Hence, the one-shot pulse output from the one-shot circuit 37 through the AND gate 38 is supplied to the set terminal S of the RS flip flop 40 to set the RS flip flop 40.

As a result, the output signal of high level output from the output terminal Q of the RS flip flop 40 is supplied to the AND gate 42 through the OR gate 39. The output signal of high level from the AND gate 42 is supplied as an ON signal to the gate driver 60. Therefore, as illustrated in (c) of FIG. 6, from the gate driver 60, the switching control signal in ON state is output to the gate of the MOSFET 7, and then the MOFET7 turns on.

When the MOSFET 7 turns on, the discharge corresponding to the capacitive component in the main circuit, the gate driving current, and the parasitic inductance generate a surge type current where the voltage of the current detection signal tends to increase. The generated surge type current inverts the comparison signal output from the comparator 46 to high level. The comparison signal is supplied to the reset terminal R of the RS flip flop 40, and then the RS flip flop 40 will be reset.

At the time of generating the surge type current, however, the one-shot pulse is supplied to the set terminal S of the RS flip flop 40. As the set signal has priority in the RS flip flop 40, the set state continues, even if the reset signal of the comparison signal is input. Therefore, it is possible to prevent an influence of the surge type current at the time of turning on the MOSFET 7.

Afterward, the MOSFET 7 becomes ON state, and the current detection signal Vi, which is input into the CS terminal, increases, as illustrated in (b) of FIG. 6. At a time point t2', when the current detection signal Vi reaches the output signal Vfb_cp of the feedback voltage clamp circuit 45, the comparison signal of high level is output from the comparator 46. This comparison signal is supplied to the reset terminal R of the RS flip flop 40, the RS flip flop 40 is reset, and the output signal output from the output terminal Q is inverted to low level. For this reason, an output signal from the AND gate 42 becomes low level, the switching control signal output from the gate driver 60 is inverted to low level, as illustrated in (c) of FIG. 6, and then the MOSFET 7 turns off.

After that, whenever the one-shot pulse is output, the same operation as described above is repeated. The switching control signal is sequentially generated such that its pulse width is same as a period while the current detection signal Vi is increasing to reach the output voltage Vfb_cp of the feedback voltage clamp circuit 45, so that the MOSFET 7 repeats turning on and off.

Further, at the time point t5, the output signal Vfb_cp from the feedback voltage clamp circuit 45 stops decreasing, and becomes the constant voltage Vomin. Thus, when the one-shot pulse is output from the time point t5 to the time point t6 when the feedback voltage Vfb is lower than the preset threshold voltage Vfbt, the RS flip flop 40 is set accordingly, and the output signal becomes high level. Hence, the switching control signal illustrated in (c) of FIG. 6 is output to the gate of the MOSFET 7 from the gate driver 60, and turns on the MOSFET 7.

Therefore, the current detection signal Vi, which is supplied to the CS terminal, increases as illustrated in (b) of FIG. 6. When the current detection signal Vi reaches the constant voltage Vomin of the output signal Vfb_cp of the feedback voltage clamp circuit 45, the comparison signal from the comparator 46 becomes high level, the RS flip flop 40 is reset, the switching control signal output from the gate driver 60 is inverted to low level, and the MOSFET 7 turns off.

In this situation, since the minimum voltage of the output signal Vfb_cp, which is output from the feedback voltage clamp circuit 45, is clamped at the constant voltage Vomin, the pulse width of the switching control signal, which is formed from the time when the MOSFET 7 turns on and the current detection signal Vi begins increasing to the time when the current detection signal Vi reaches the output signal Vfb_cp, is the minimum pulse width at the switching end. The minimum pulse width is larger than that of a one-shot pulse. At the end of the switching control signal, no pulse width smaller than the minimum pulse width at the switching end time will be formed. Therefore, there is no chance that only a switching loss occurs without the energy transmission from the primary side to the secondary side, so that it is possible to suppress the switching loss and to improve the efficiency.

The feedback voltage clamp circuit 45 can set the minimum pulse width of the switching control signal at the switching end time, such that the output signal Vfb_cp becomes the constant voltage Vs1 at least in a lower voltage region of the feedback voltage Vfb and in a higher voltage region than the preset threshold voltage Vfbt. The minimum pulse width at the switching end time can be set easily.

In the light load case, as described above, the switching of the MOSFET 7 is controlled in a section while the feedback voltage Vfb is higher than the preset threshold voltage Vfbt, whereas the switching of the MOSFET 7 is stopped in a section while the feedback voltage Vfb is lower than the preset threshold voltage Vfbt. This operation is repeatedly performed to be a burst operation.

In the heavy load case, the oscillation frequency of the PWM oscillator 35 is fixed at a high frequency, and the switching of the MOSFET 7 is continuously operated.

In the above-described embodiments, the descriptions have been given of the case where the feedback voltage clamp circuit 45 also has a level shift function. However, the present invention is not limited to this configuration. Instead of providing the level shift function in the feedback voltage clamp circuit 45, a level shift circuit may be arranged on a previous stage of the feedback voltage clamp circuit 45.

In the above-described embodiments, the descriptions have been given of the case where the feedback voltage clamp circuit 45 includes the operational amplifier 45a and four resistors including the first resistor R1 to the fourth resistor R0. However, the present invention is not limited to this configuration. When the feedback voltage Vfb can be set not to make the voltage VX at the connection point X decrease to zero in the region lower than the preset voltage Vfb1, the feedback voltage clamp circuit 45 can be clamped at a fixed value determined by the resistance values of the second resistor R2 and the third resistor R3, which are included in the voltage dividing circuit. In short, the minimum pulse width of the switching control signal can be set not to be smaller than the minimum pulse width capable of contributing to supplying of the power to the load.

In the above-described embodiments, the descriptions have been given of the case where the feedback voltage clamp circuit 45 clamps at least the minimum voltage side of the feedback voltage Vfb, so as to prevent the pulse width of the switching control signal from decreasing from the minimum pulse width at the switching end time. However, the present invention is not limited to this configuration. The feedback voltage clamp circuit 45 can be omitted, and instead of the feedback voltage clamp circuit 45, a voltage decrease suppression circuit configured to suppress the current detection signal Vi from decreasing to be lower than the preset voltage may be provided. In this case, a comparison circuit configured to compare the current detection signal Vi with the preset voltage may be provided, so that even if the magnitude relationship between the feedback voltage Vfb and the current detection signal Vi is reversed, the output of the switching control signal to the switching element can continue without a change, until the comparison circuit detects that the current detection signal Vi reaches the present voltage. For example, a block circuit may be provided so that the output from the comparator 46 is not transmitted to the RS flip flop 40, until the comparison circuit detects that the current detection signal Vi reaches the present voltage, so that the above operation can be realized.

REFERENCE SIGNS LIST

1 . . . alternating current power supply, 4 . . . diode bridge, 6 . . . flyback transformer, L11 . . . primary winding, L21 . . . secondary winding, L12 . . . primary-side auxiliary winding, 7 . . . switching element, 8 . . . current detection resistor, 11 . . . control circuit, 22 . . . photocoupler, 23 . . . shunt regulator circuit, 27 . . . load, 24 . . . shunt regulator, 31 . . . start up circuit, 32 . . . under voltage lockout (UVLO) circuit, 33 . . . internal power supply circuit, 35 . . . pulse width modulation oscillator, 37 . . . one-shot circuit, 40 . . . RS flip flop, 43 . . . feedback voltage determination circuit, 45 . . . feedback voltage clamp circuit, 45a . . . operational amplifier, R1 . . . first resistor, R2 . . . second resistor, R3 . . . third resistor, R0 . . . fourth resistor, 46 . . . comparator, 60 . . . gate driver, DR . . . drive circuit

The invention claimed is:

1. A switching power supply device, comprising:
   a switching power supply configured to control switching of a switching element connected in series with a primary main winding of a transformer to which an input voltage is applied, and to rectify a voltage generated at a secondary main winding of the transformer to obtain an output voltage to be output to a load; and
   a controller configured to control the switching of the switching element,
   the controller comprising:
      a feedback voltage determination circuit configured to determine whether a feedback voltage indicating a difference between a predetermined output voltage and the output voltage is lower than a preset threshold;
      a comparator circuit configured to compare a signal based on the feedback voltage with a current detection signal obtained by detecting a current of the switching element, as a voltage;
      an oscillation circuit configured to oscillate at a frequency based on the feedback voltage;
      a drive circuit configured to output a switching control signal of controlling the switching element based on a determination result of the feedback voltage determination circuit, a comparison signal of the comparator circuit, and an oscillation signal of the oscillation circuit; and
      a pulse width holder configured to hold a pulse width of the switching control signal at least at a minimum pulse width capable of contributing to supplying power to a load, when the load is light,
   wherein the pulse width holder comprises a feedback voltage clamp circuit configured to form an output signal in which at least a low voltage side of the feedback voltage is clamped, and
   wherein the comparator circuit is configured to compare the output signal of the feedback voltage clamp circuit with the current detection signal obtained by detecting the current of the switching element, as the voltage.

2. The switching power supply device according to claim 1, wherein the feedback clamp circuit is configured to clamp the feedback voltage at a constant voltage, when the feedback voltage is at least equal to or lower than the preset threshold of the feedback voltage determination circuit.

3. The switching power supply device according to claim 1, wherein the feedback clamp circuit comprises:
   an operational amplifier having a non-inverting input terminal to which the feedback voltage is input;
   a first resistor, a second resistor, and a third resistor, which are connected in series between a power supply terminal into which a predetermined power supply voltage is input and the ground;
   a fourth resistor connected between an output terminal of the operational amplifier and a first connection point of the first resistor and the second resistor; and
   an output terminal connected to a second connection point of the second resistor and the third resistor to output the output signal, and
   wherein a potential of the first connection point of the first resistor and the second resistor is input into an inverting input terminal of the operational amplifier.

* * * * *